(12) United States Patent
Chinn et al.

(10) Patent No.: US 6,332,916 B1
(45) Date of Patent: Dec. 25, 2001

(54) ACTIVATED CARBON FILTER AND PROCESS FOR THE SEPARATION OF NOXIOUS GASES

(75) Inventors: Matthew J Chinn; Paul R Norman, both of Salisbury; Philip A Barnes; Elizabeth A Dawson, both of Leeds, all of (GB)

(73) Assignee: The Secretary of State for Defence in Her Brittanic Majesty's Government of the United Kingdom of Great Britain and Northern Ireland, Hampshire (GB)

( * ) Notice: Subject to any disclaimer, the term of this patent is extended or adjusted under 35 U.S.C. 154(b) by 0 days.

(21) Appl. No.: 09/486,438

(22) PCT Filed: Aug. 20, 1998

(86) PCT No.: PCT/GB98/02515

§ 371 Date: Feb. 28, 2000

§ 102(e) Date: Feb. 28, 2000

(87) PCT Pub. No.: WO99/11358

PCT Pub. Date: Mar. 11, 1999

(30) Foreign Application Priority Data

Aug. 30, 1997 (GB) .................................................. 9718314

(51) Int. Cl.[7] .................................................. C01B 31/08
(52) U.S. Cl. ........................... 95/128; 55/522; 55/DIG. 5; 95/97; 95/104; 96/153; 264/29.7; 264/DIG. 48; 502/416; 502/427
(58) Field of Search ................................. 55/522, DIG. 5; 95/97, 104, 128; 96/153; 131/334, 342, 345; 264/29.7, 182, DIG. 48; 502/180, 183, 184, 406, 414, 416, 417, 427

(56) References Cited

U.S. PATENT DOCUMENTS

| | | | |
|---|---|---|---|
| 2,701,792 | * 2/1955 | Owen | 502/416 |
| 3,886,093 | * 5/1975 | Dimitri | 502/417 |
| 3,997,638 | * 12/1976 | Manning et al. | 264/29.4 |
| 4,062,368 | * 12/1977 | Crellin et al. | 131/342 |
| 4,113,651 | * 9/1978 | Chornet et al. | 502/182 |
| 4,242,226 | 12/1980 | Siren . | |
| 5,344,626 | * 9/1994 | Abler | 502/180 |
| 5,496,785 | * 3/1996 | Abler | 502/180 |

FOREIGN PATENT DOCUMENTS

| | | |
|---|---|---|
| 09 173829 | 7/1997 | (JP) . |
| WO 94 00383 A | 1/1994 | (WO) . |

OTHER PUBLICATIONS

Barnes et al Preparation of Catalysts VI, 1995, vol. 91, pp. 361–370 "A new method for the preparation of metal–carbon catalysts".

* cited by examiner

Primary Examiner—David A. Simmons
Assistant Examiner—Minh-Chau T. Pham
(74) Attorney, Agent, or Firm—Nixon & Vanderhye

(57) ABSTRACT

Activated carbon filters containing transition metals, are prepared by (a) exchanging the transition metal with a cellulose ion exchange material to produce a cellulose material containing the transition metal; (b) charring of the product of (a); activating the product of (b) to form an activated carbon filter having a pore network throughout; and removing surface carbon substantially throughout the pore network of the filter formed in (c). Methods of filtering an atmosphere containing a gaseous contaminant by passing the contaminated atmosphere through a filter made by this process are described.

21 Claims, 3 Drawing Sheets

ACTIVATED CARBON FILTER AND PROCESS FOR THE SEPARATION OF NOXIOUS GASES

The present invention relates to filtration processes. It is particularly concerned with the use of activated carbon filters to remove toxic chemicals from a breathable atmosphere.

According to the present invention a method of filtering an atmosphere containing a gaseous contaminant comprising passing said atmosphere through an activated carbon filter containing at least one transition metal, the filter material having been prepared in a process including, inter alia, the exchange of the metal ion with a cellulose ion exchange resin.

Preferably the transition metal is copper, cobalt, chromium or silver. A suitable process for the production of the activated carbon filter containing one or more of these metals is described by P A Barnes and E A Dawson in "A New Method for the Production of Metal-Carbon Catalysts" published in the Proceedings of the 6th International Symposium on Catalyst Preparation, University of Louvain-la-Neuve, September 1994. In general terms in this process the starting material is typically an ion exchange material in the form of carboxymethyl cellulose (Whatman CM32) as an alkali metal salt such as a sodium salt. Hydroxyl groups on the cellulose chain are modified to form an ether group which carries a metal carboxylic substituent, for example of formula $O(CH_2)_2COOM$ where n is an integer of from 1 to 6 and M is an exchangeable cation. A particular group is $OCH_2COONa$, with sodium as an exchangeable cation. An ion exchange reaction is set up with a suitable metal salt, preferably a nitrate or sulfate of the metal, for example copper sulfate, and the resulting residue is dried and then charred in an inert gas flow. It is then cooled under an inert gas and this is followed by activation in a nitrogen stream containing steam, to result in a carbon matrix holding the metal relatively uniformly dispersed throughout. This primary activation may be followed by a secondary oxidation by heating in a flow of oxygen in helium to chemisorb oxygen on the carbon surface. The resulting pore widening improves access to the metal by the gases being filtered.

The amount of metal present is preferably arranged to be between 3% and 18% by weight.

Preferably the metal is copper, but cobalt and silver are also effective, singly or in combinations with one another or copper. When such combinations are contemplated the ion exchange process for each may take place simultaneously.

The percentage ion exchange and the carbon activation time both have significant effect on the property of the resultant filter to adsorb hydrogen cyanide. Low ion exchange, less than 50% and preferably about 25% or less has been found to favor dispersion of the metal and to increase the capacity of the fitter to adsorb HCN. Long activation times, for example 6 to 12 hours or more increase the capacity to adsorb HCN very considerably. The activation is catalyzed by the presence of copper, and the metal then becomes a center for evolved gases and in the final product the nucleus for transport passages through which reacting gases may diffuse. Cobalt and silver are also both capable of this catalytic effect.

The reaction of hydrogen cyanide with copper and copper salts on activated carbon results in the release of cyanogen $(CN)_2$ as a volatile reaction product. Due to the toxic nature of cyanogen additional measures may need to be taken for its removal, particularly when copper is the primary metal present. This is much less the case when cobalt is the primary metal.

The filter material may be arranged to contain chromium, in addition to the copper, cobalt or silver. Where copper and chromium are employed, the presence also of silver is particularly useful. There is no lower limit for the secondary metal. The upper limit may be of the order of 11% by weight.

Particularly good results in terms of the removal of both hydrogen cyanide and the product cyanogen are achieved in activated carbon filters containing copper, chromium and silver. Various examples of filtration and the construction of filters suitable for use in processes according to the invention will now be described, by way of example, with reference to the accompanying drawings.

Table 1 below lists a number of samples of filter materials which were tested for their ability to remove HCN.

DETAILED DESCRIPTION OF THE INVENTION

TABLE 1

| Sample | Exchanged metal ion | Percentage metal by weight | Number of HCN pulses removed | Pulses before cyanogen breakthrough |
|---|---|---|---|---|
| 502 | $Cu^{2+}$ | 2 | 6 | — |
| 505 | $Cr_2O_7^{2-}$ | 13 | 8 | — |
| 506 | $Ag^{2+}$ | 5 | 60 | — |
| 507 | $Cu^{2+}$ | 10 | 80 | — |
| 5070 | $Cu^{2+}$ | 10 | 120 | — |
| 508 | $Cu^{2+}$ | 17 | 46 | — |
| 510 | $Cu^{2+}/Cr^{2+}$ | 8/9 | 98 | — |
| 511 | $Co^{2+}$ | 16 | 85 | 62 |
| 512 | $Cu^{2+}/Co^{2+}$ | 8/8 | 53 | 60 |
| 513 | $Cu^{2+}/Cr^{3+}/Ag+$ | 5/1/3.5 | 141 | 120 |
| 515 | $Cu^{2+}/Ag+$ | 5/1 | 25 | 12 |
| 517 | $Ag^+$ | 18 | 15 | — |
| 518 | $Cu^{2+}/Co^{2+}/Ag+$ | 6/—/1 | 54 | 40 |
| ASC | Cu/Cr/Ag (whetlerite) | 6–9/1.5–3.5/0–0.5 | 120 | 85 |

Samples 506 to 518 represent examples of filter materials in accordance with the invention, while samples 502, 505 and ASC are outside the scope of the invention and are included for the purposes of comparison.

Figure 1:
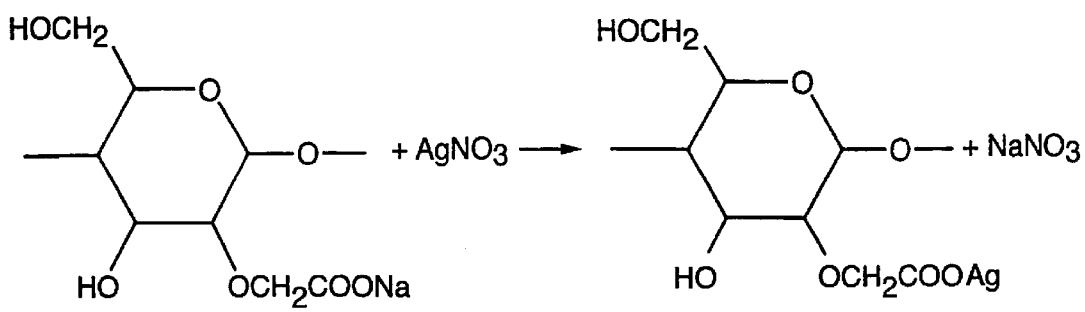
FIG. 1 illustrates an ion exchange process.

Thus sample 506 is a filter carbon containing 5% by weight silver, 507 contains 10% by weight copper etc. These samples 506 to 518 were prepared as now described below. The starting material for the creation of filter carbon was carboxymethyl cellulose (Whatman, CM32), this being a sodium salt ion exchange medium. Hydroxyl groups on the cellulose chain were modified to $OCH_2COONa$, with sodium as the exchangeable cation. Ion exchange was then conducted using copper sulfate, cobalt nitrate and silver nitrate to give the desired metal content, the ion exchange process being as illustrated in FIG. 1.

The exchange process was conducted at room temperature by stirring the metal salt solution into a mixture of 1 gm cellulose per 100 $cm^3$ water, then leaving to stand for several hours. Afterwards the solid was filtered off, washed thoroughly in deionized water and dried. The dried material was then charred at 400° C. for one hour under a nitrogen flow. After cooling under nitrogen the carbon was activated by heating to 600° C. for 2 hours in an atmosphere of flowing nitrogen saturated with water vapour at 25° C. A relatively low temperature could be used for the activation because of the catalytic effect of the metal on carbon gasification, and one advantage of this low temperature was the minimization of sintering of surface metal particles. The standard activation time was 2 hours.

This then was the process employed for the production of samples 506 to 518. Sample 5070 however was then subjected to a further oxidation by heating to 150° C. in a flow of 5% oxygen in helium to chemisorb oxygen on the carbon surface. Removal of surface carbon as $CO_2$ was then achieved by heating to 350° C. in a pure helium flow. The oxygen/helium cycling procedure was repeated four times to give a controlled stepwise removal of carbon throughout the pore network. This results in a carbon structure in which there is, so to speak, a lattice of interconnecting pores, with the metal trapped at the pore junctions and uniformly distributed throughout the carbon.

Table 2 below shows the effect of activation time and percentage ion exchange upon the total and copper surface areas, and upon HCN adsorption, of various samples of filter material according to the invention, all of which comprised only copper in carbon.

length and 2 mm in internal diameter with a glass fiber plug at each end. Each sample was then compressed to the same degree by applying a weight to the carbon. The glass tubes were then loaded into a Chrompack CP9001 packed gas chromatography oven at 140° C. with a nitrogen carrier flow of 10 ml/min and a head pressure of 175 KPA. The effluent from the sample tubes was split; 0.75 ml/min being transferred by capillary clm to a mass spectrometer and 9.25 ml/min passing through a flame ionization detector (FID). Once the baseline from the FID had settled the samples were pulsed with the HCN vapour using an automated gas sampling valve with a 1 ml sample loop. Pulses were supplied every minute until breakthrough was observed.

It is clear from the Tables that carbon filter materials formed with copper, cobalt or silver introduced by an ion exchange mechanism as above described perform significantly well in the removal of HCN from an atmosphere. Those outside the preferred range performed much less well. The most significant results were obtained with sample 513 which contained chromium and silver as secondary metals. This showed a very high HCN adsorption coupled with a high retention of $(CN)_2$.

Sample 513 was deliberately created to compare with the sample labeled ASC. ASC was a conventional coal-based carbon impregnated with an ammoniacal solution of copper, chromium and silver, so that the final product contained the metals as salts on the carbon surface. Sample 513 performed significantly well in the adsorption of hydrogen cyanide and in withholding cyanogen. The ASC sample however, whilst exhibiting quite good hydrogen cyanide adsorption, demonstrated an extremely sharp cyanogen breakthrough which resulted in detector overload.

The results in Table 2 show that for samples containing the same amount of copper, increase in activation time caused an increase in the total Langmuir $m^2/g$ surface area. Sample 530 demonstrates in particular how important an effect activation time can have upon hydrogen cyanide absorbability. The Table demonstrates that while an activation time of 6 hours produces a significant improvement over lower times, 12 hours gives particularly good results.

It is also discernible from Table 2 in comparison with Table 1, that the lower percentage ion exchange of 25% gave better results than 50% and certainly than 100%.

TABLE 2

| Sample | Activation time (h) | % ion exchange | % copper | Total surface area | Dispersion | Cu area | HCN pulses removed |
|---|---|---|---|---|---|---|---|
| 521 | 2 | 100 | 10.1 | 372 | 4.0 | 3.8 | 9 |
| 522 | 4 | 100 | 10.6 | 344 | 14.2 | 14.3 | 17 |
| 523 | 6 | 100 | 10.2 | 437 | 16.5 | 16 | 25 |
| 524 | 2 | 50 | 6.4 | 449 | 15.2 | 9.2 | 20 |
| 525 | 4 | 50 | 6.5 | 443 | 26.1 | 16.1 | 29 |
| 526 | 6 | 50 | 6.5 | 497 | 35.5 | 21.9 | 47 |
| 527 | 2 | 25 | 3.4 | 389 | 13.3 | 4.3 | 19 |
| 528 | 4 | 25 | 3.4 | 359 | 9.3 | 3.0 | 28 |
| 529 | 6 | 25 | 3.5 | 468 | 17.5 | 5.8 | 57 |
| 530 | 12 | 25 | 3.5 | 518 | 67.8 | 22.5 | 110 |

Figure 2:
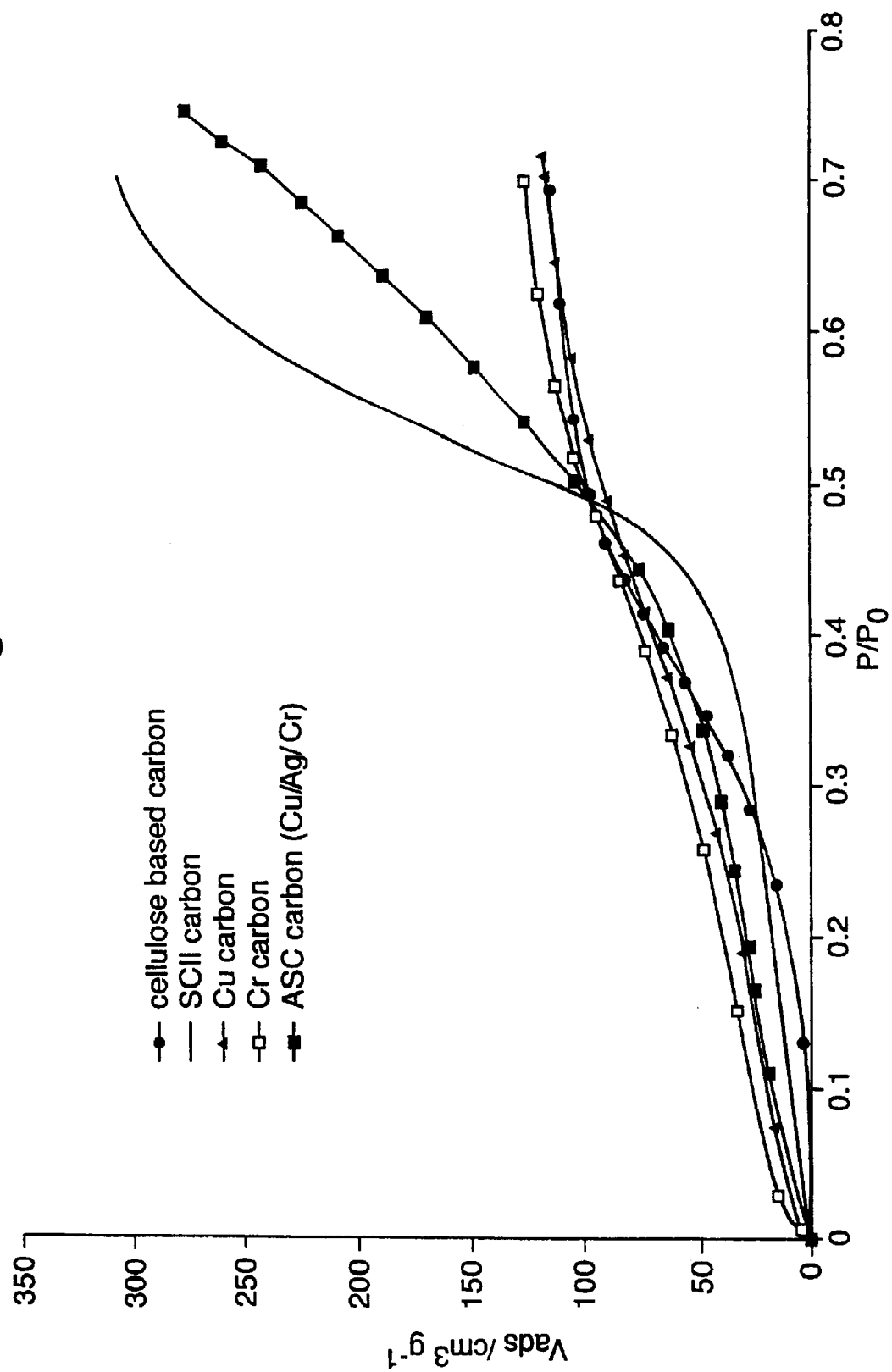
FIG. 2 is a graph comparing water adsorption properties.
Figure 3:
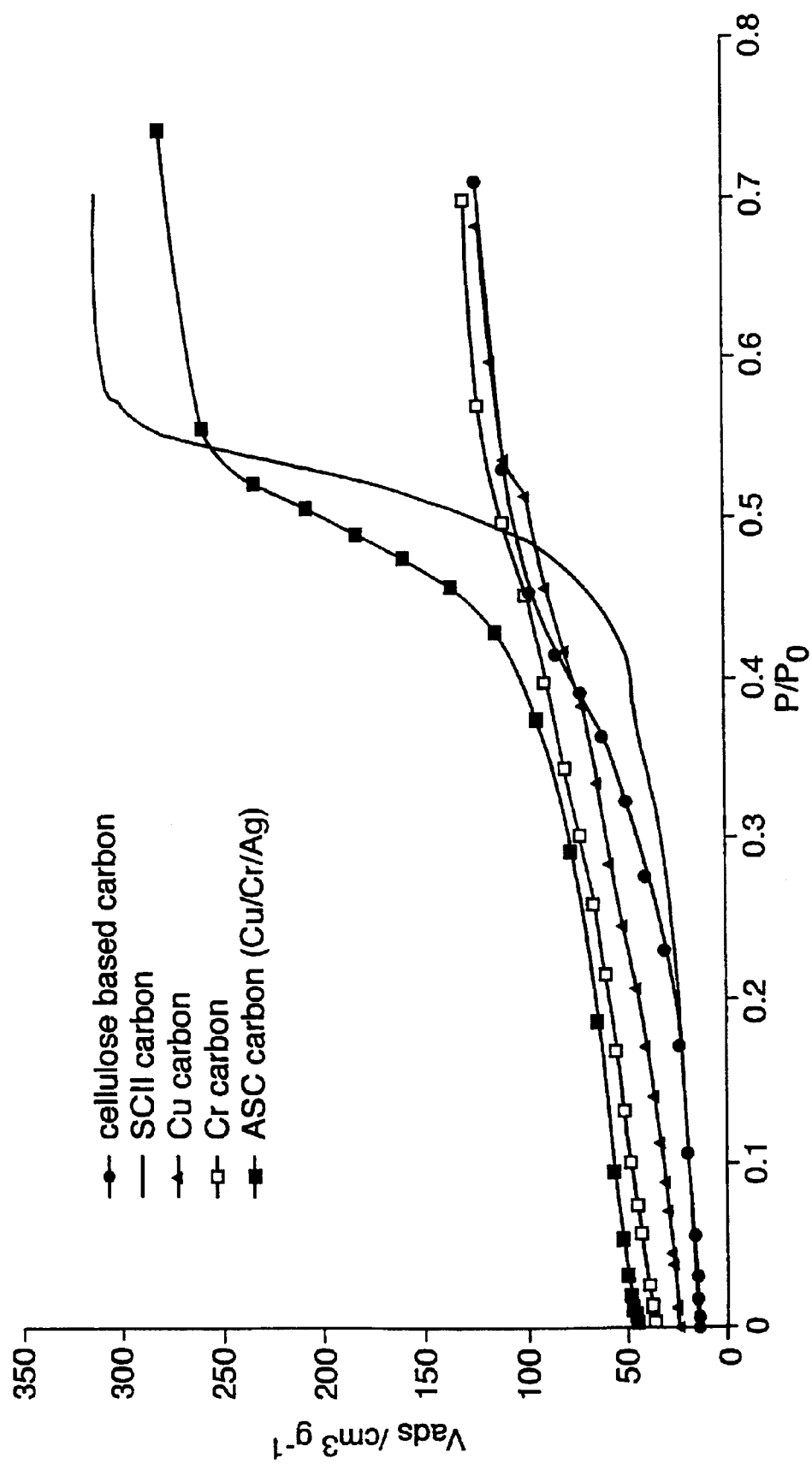
FIG. 3 is a graph comparing water desorption properties.

The carbons were tested against pulses of 10,000 $mg/m^3$ HCN/air mixture, the air having been at a relative humidity of 80%. Prior to testing the carbons were sieved, with the fractions between 600 $\mu m$ and 150 $\mu m$ being used. Carbon samples (10 mg) were loaded into glass tubes 60 mm in FIGS. 2 and 3 show that there was no great difference in water adsorption and desorption between the carbon filter materials according to the invention and SCII and ASC carbon at levels of $P/P_0$ below 0.5. Above that level however carbon materials in accordance with the invention performed significantly better.

What is claimed is:

1. A method of manufacture of an activated carbon filter comprising at least one transition metal, the method comprising:
   (a) exchanging of at least one transition metal with a cellulose ion exchange material to produce a cellulose material comprising the at least one transition metal;
   (b) charring of the product of (a);
   (c) activating the product of (b) to form an activated carbon filter having a pore network throughout; and
   (d) removing surface carbon substantially throughout the pore network of the filter formed in (c).

2. A method according to claim 1 wherein step (d) is performed at least twice.

3. A method according to claim 1 wherein the at least one transition metal is copper, cobalt, chromium or silver.

4. A method according to any claim 1 wherein the cellulose ion exchange material is an alkali metal salt carboxymethyl cellulose.

5. A method according to claim 1 wherein the cellulose ion exchange material carries an ether group having the formula —O(CH$_2$)$_n$COOM where n is an integer from 1 to 6 and M is an exchangeable cation.

6. A method according to claim 1 wherein the cellulose ion exchange material carries an ether group having the formula —O(CH$_2$)$_n$COOM where n is an integer from 1 to 6 and M is an exchangeable cation, in which the ether group is formed by modifying hydroxyl groups on the cellulose chain of a precursor.

7. A method according to claim 1 wherein step (a) comprises exposing of the cellulose ion exchange resin to a solution of a salt of the at least one transition metal.

8. A method according to claim 1 wherein step (b) comprises heating the product of step (a) in an inert atmosphere.

9. A method according to claim 1 wherein step (c) comprises heating the product of step (b) in a flowing nitrogen atmosphere which is saturated with water vapor at 25° C.

10. A method according to claim 1 wherein step (c) comprises heating the product of step (b) in a flowing nitrogen atmosphere which is saturated with water vapor at 25° C. and further wherein the product of step (b) is heated to 600° C.

11. A method according to claim 1 wherein step (d) comprises the sequential steps of oxidizing the surface carbon and thereafter removing the oxidized surface carbon as carbon dioxide.

12. A method according to claim 1 wherein step (d) comprises the sequential steps of oxidizing the surface carbon and removing the oxidized surface carbon as carbon dioxide and wherein the step of oxidizing the surface carbon comprises heating in an atmosphere comprising oxygen.

13. A method according to claim 1 wherein step (d) comprises the sequential steps of oxidizing the surface carbon and removing the oxidized surface carbon as carbon dioxide and further wherein the step of oxidizing the surface carbon comprises heating to 150° C. in an atmosphere comprising 5% vol./vol. O$_2$ in helium.

14. A method according to claim 1 wherein step (d) comprises the sequential steps of oxidizing the surface carbon and removing the oxidized surface carbon as carbon dioxide, further wherein removing the oxidized surface carbon as carbon dioxide comprises heating in an inert atmosphere.

15. A method according to claim 1 wherein step (d) comprises the sequential steps of oxidizing the surface carbon and removing the oxidized surface carbon as carbon dioxide and wherein removing the oxidized surface carbon as carbon dioxide comprises heating to 350° C. in an atmosphere of helium.

16. An activated carbon filter produced by the method of claim 1.

17. An activated carbon filter produced by the method of claim 1, wherein the amount of metal present is between 3% and 18% by weight.

18. An activated carbon filter produced by the method of claim 1, wherein the amount of chromium present is up to 11% by weight.

19. An activated carbon filter containing at least one transition metal, wherein the carbon filter has a structure in which there is a lattice of interconnecting pores, said at least one transition metal being trapped at pore junctions and is substantially uniformly distributed throughout the carbon, and wherein the filter material has been prepared in a process including the exchange of at least one transition metal with a cellulose ion exchange resin and the removal of surface carbon from the pore network of the filter.

20. A method of filtering an atmosphere containing a gaseous contaminant comprising passing said atmosphere through an activated carbon filter of claim 19.

21. A method of filtering an atmosphere containing a gaseous contaminant comprising passing said atmosphere through an activated carbon filter of claim 19.

* * * * *